United States Patent
Uchida

(10) Patent No.: US 6,886,957 B2
(45) Date of Patent: May 3, 2005

(54) LIGHTING SYSTEM FOR VEHICLE

(75) Inventor: Hideki Uchida, Shizuoka (JP)

(73) Assignee: Koito Manufacturing, Co., Ltd., Tokyo (JP)

( * ) Notice: Subject to any disclaimer, the term of this patent is extended or adjusted under 35 U.S.C. 154(b) by 0 days.

(21) Appl. No.: 10/383,981

(22) Filed: Mar. 7, 2003

(65) Prior Publication Data

US 2003/0169587 A1 Sep. 11, 2003

(30) Foreign Application Priority Data

Mar. 7, 2002  (JP) ................................. P. 2002-061462

(51) Int. Cl.[7] ................................................ B60Q 1/08
(52) U.S. Cl. .................... 362/37; 362/466; 362/467
(58) Field of Search ........................ 362/37, 464, 465, 362/466, 514

(56) References Cited

U.S. PATENT DOCUMENTS 4,943,893 A    7/1990  Shibata et al.
6,302,553 B1 * 10/2001  Izawa ........................ 362/37
6,478,460 B2 * 11/2002  Furuya et al. ............. 362/514

* cited by examiner

Primary Examiner—Sandra O'Shea
Assistant Examiner—Guiyoung Lee
(74) Attorney, Agent, or Firm—Fish & Richardson P.C.

(57) ABSTRACT

In a lighting system for a vehicle comprising lamp deflection angle control means for changing and controlling a deflection angle in the irradiating direction of a lamp corresponding to the running situation of the vehicle, lamp deflection angle control means 2 and 4 include means 45 and 5 for setting the irradiating direction of a lamp 30 into a preset reference position when an ignition switch S2 is turned ON. When the electrical system of the vehicle is turned ON so that the illumination of the vehicle can be carried out, the irradiating direction of the lamp 30 is set into the reference position. Consequently, when the lamp is turned ON again, a car running in an opposite direction can be prevented from being dazzled by the illuminated light of the lamp.

8 Claims, 13 Drawing Sheets

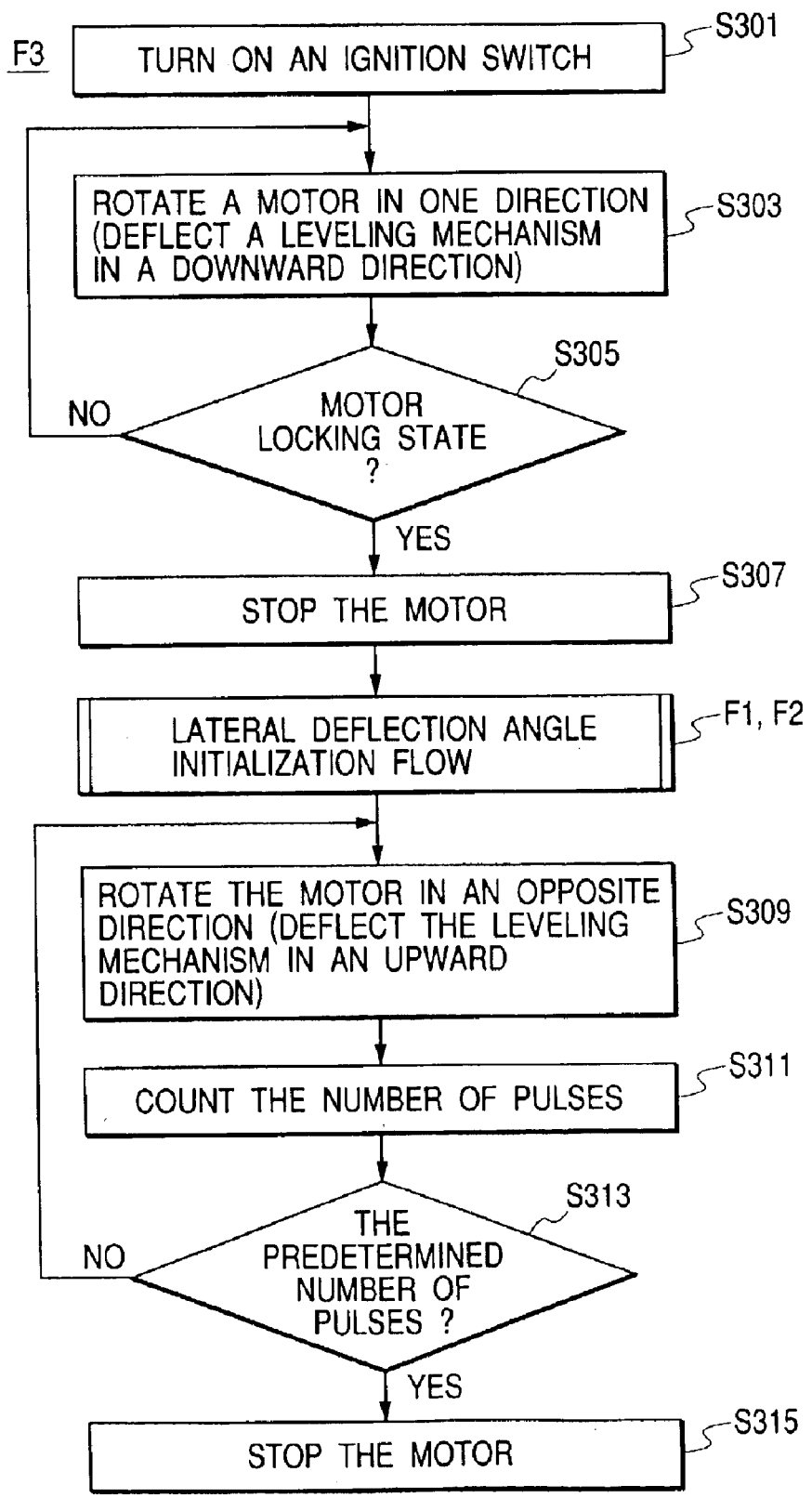

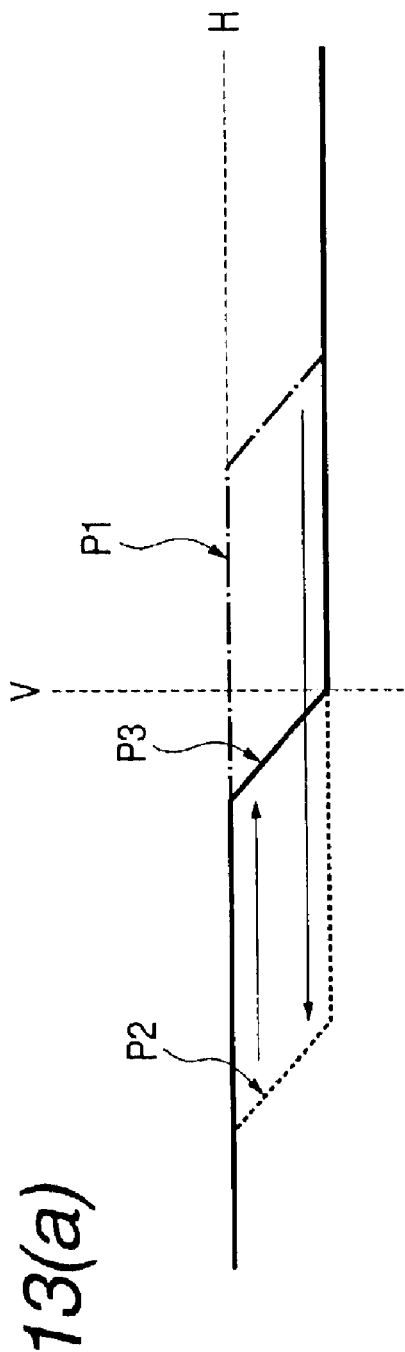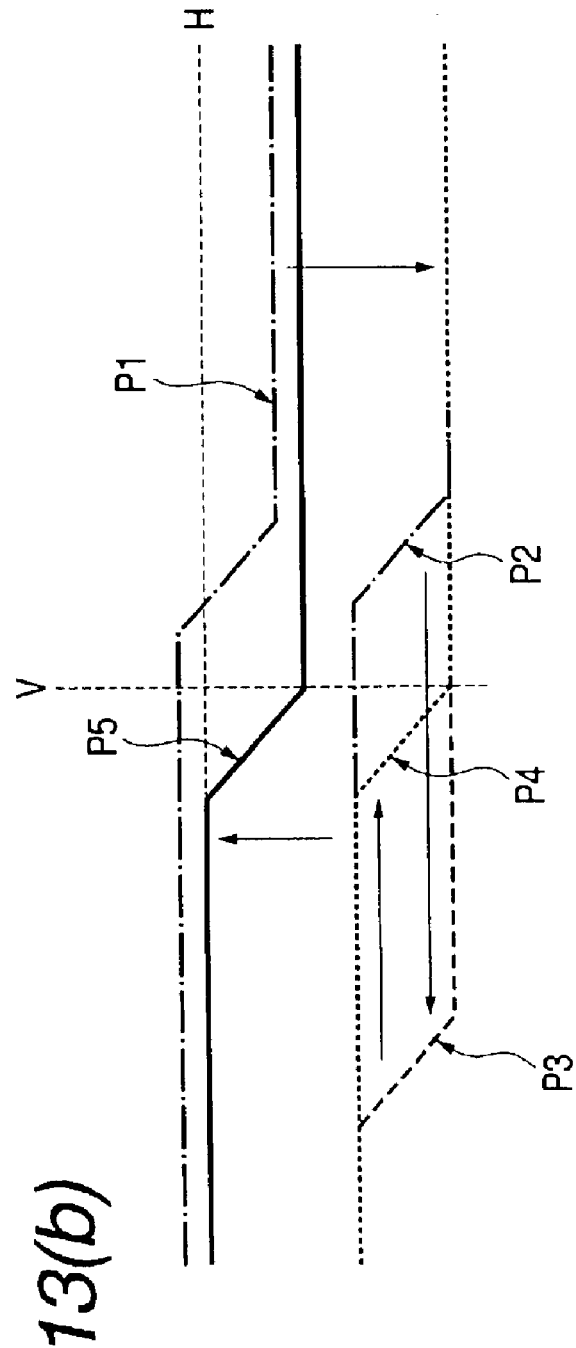
FIG. 13(a)
FIG. 13(b)

LIGHTING SYSTEM FOR VEHICLE

BACKGROUND OF THE INVENTION

1. Field of the Invention

The present invention relates to a lighting system for a vehicle such as a car, and more particularly to a lighting system for a vehicle comprising lamp deflection angle control means for follow-up changing an irradiating direction of a light of a lamp corresponding to a running situation, for example, an adaptive front-lighting system (hereinafter referred to as an AFS) which can implement an enhancement in precision in deflection angle control.

2. Description of the Related Art

The AFS proposed to enhance the running safety of a car detects information about the steering angle of a steering wheel SW of the car, the speed of the car, and the running situation of the car by means of a sensor 1 and sends the detected output to an electronic control unit (hereinafter referred to as an ECU) 2 as shown in a conceptual view of FIG. 1. The ECU 2 controls swivel type lighting units (lamps) 3R and 3L provided on the right and left of the front part of the car, that is, a headlamp 3 capable of deflecting and controlling an irradiating direction in a lateral direction based on the output of the sensor which is input. The swivel type lighting units 3R and 3L have such a structure that a reflector provided in the headlamp can be rotated in a horizontal direction and is driven to be rotated by a driving force source such as a motor, for example. A mechanism for a rotation will be referred to as an actuator. According to the AFS of this type, when the car runs on a curved road, it is possible to illuminate the curved road corresponding to the running speed of the car. Thus, the AFS is effective for enhancing a running safety.

In order to implement a proper illumination in the AFS, however, it is necessary to cause the steering angle of a steering wheel to correctly correspond to the deflection angle of a swivel type lighting unit. When the correspondence cannot be taken, the optical axis of the swivel type lighting unit cannot illuminate a region in a direction which is not preferable for the running direction of the car, for example, a forward part in the straight running or curving in an opposite direction which is carried out by the car. Alternatively, a car running in an opposite direction is dazzled due to a deflection toward the opposite lane side. Thus, there is a problem of the running safety In a conventional AFS, therefore, an actuator of a swivel type lighting unit is provided with a detector for detecting a deflection angle. For example, a potentiometer is provided in a part of a gear mechanism for deflecting the swivel type lighting unit and a deflection angle is detected from the output of the potentiometer. However, the provision of the detector is not preferable because the structure of the actuator is complicated and large-sized. For this reason, it is proposed that the rotating angle of a motor to be a driving source of the actuator is detected and the deflection angle of the swivel type lighting unit is thus detected. A hole IC for outputting the number of pulses corresponding to the amount of the rotation of the motor is used for the rotation detector. However, the rotation detector of this type can detect the amount of the rotation (the rotating angle) in such a state that the motor is operated continuously. When a power supply is once turned OFF, the output of the rotation detector is reset. For this reason, the deflection angle of the swivel type lighting unit cannot be detected when the power supply is turned ON again. Consequently, there is a problem in that the running safety cannot be obtained and a car running in an opposite direction is dazzled as described above.

In the conventional AFS, moreover, a deflecting operation is always carried out irrespective of the lighting state of the lighting unit. For this reason, also in the case in which the lighting unit is turned OFF, it is swiveled in conformity to the steering angle of a steering wheel. The swiveling operation of the lighting unit is wasteful during power-off. The wasteful swiveling operation causes a damage due to the fatigue of the actuator, resulting in a deterioration in the lifetime and reliability of a device.

SUMMARY OF THE INVENTION

It is an object of the invention to provide a lighting system for a vehicle which implements the proper deflecting operation of an actuator in an AFS, maintains the running safety of a vehicle and suppress the damage of a device, thereby improving a reliability.

A first aspect of the invention is directed to a lighting system for a vehicle comprising lamp deflection angle control means for changing and controlling a deflection angle in an irradiating direction of a lamp corresponding to a running situation of the vehicle, wherein the lamp deflection angle control means includes means for setting the irradiating direction of the lamp into a preset reference position when an electrical system of the vehicle is turned ON.

A second aspect of the invention is directed to a lighting system for a vehicle comprising lamp deflection angle control means for changing and controlling a deflection angle in an irradiating direction of a lamp corresponding to a running situation of the vehicle, wherein the lamp deflection angle control means includes means for setting the irradiating direction of the lamp into a preset reference position when the lamp is turned OFF.

In the invention, the lamp deflection angle control means includes means for setting the lamp into a reference position in a horizontal direction of the lamp or both of horizontal and vertical directions.

According to the invention, when the electrical system of the vehicle is turned ON so that the illumination of the vehicle can be carried out, the irradiating direction of the lamp is set into the reference position so that a car running in an opposite direction can be prevented from being dazzled by the illuminated light of the lamp when the lamp is turned ON. By stopping a deflecting operation when turning OFF the lamp, moreover, the wasteful deflecting operation of the lamp can be avoided and the lifetime of the device can be prolonged to enhance a reliability.

BRIEF DESCRIPTION OF THE DRAWINGS

FIG. 12 is a flowchart for an initialization flow in both of vertical and lateral deflecting directions which is executed when the ignition switch is turned ON, and FIGS. 13(a) and 13(b) show the diagrams for explaining a change in a light distribution characteristic in the initialization flow.

DESCRIPTION OF THE PREFERRED EMBODIMENTS

Figure 1:
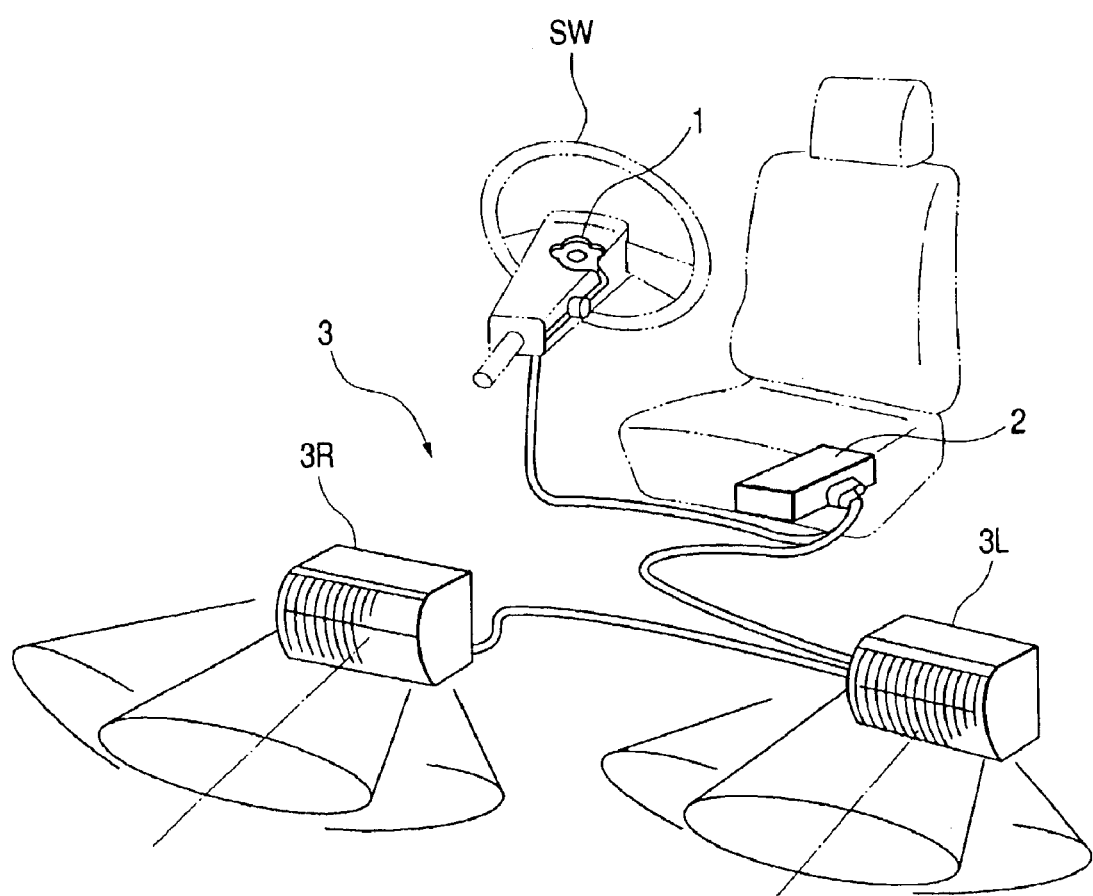
FIG. 1 is a view showing the conceptual structure of an AFS.
Figure 2:
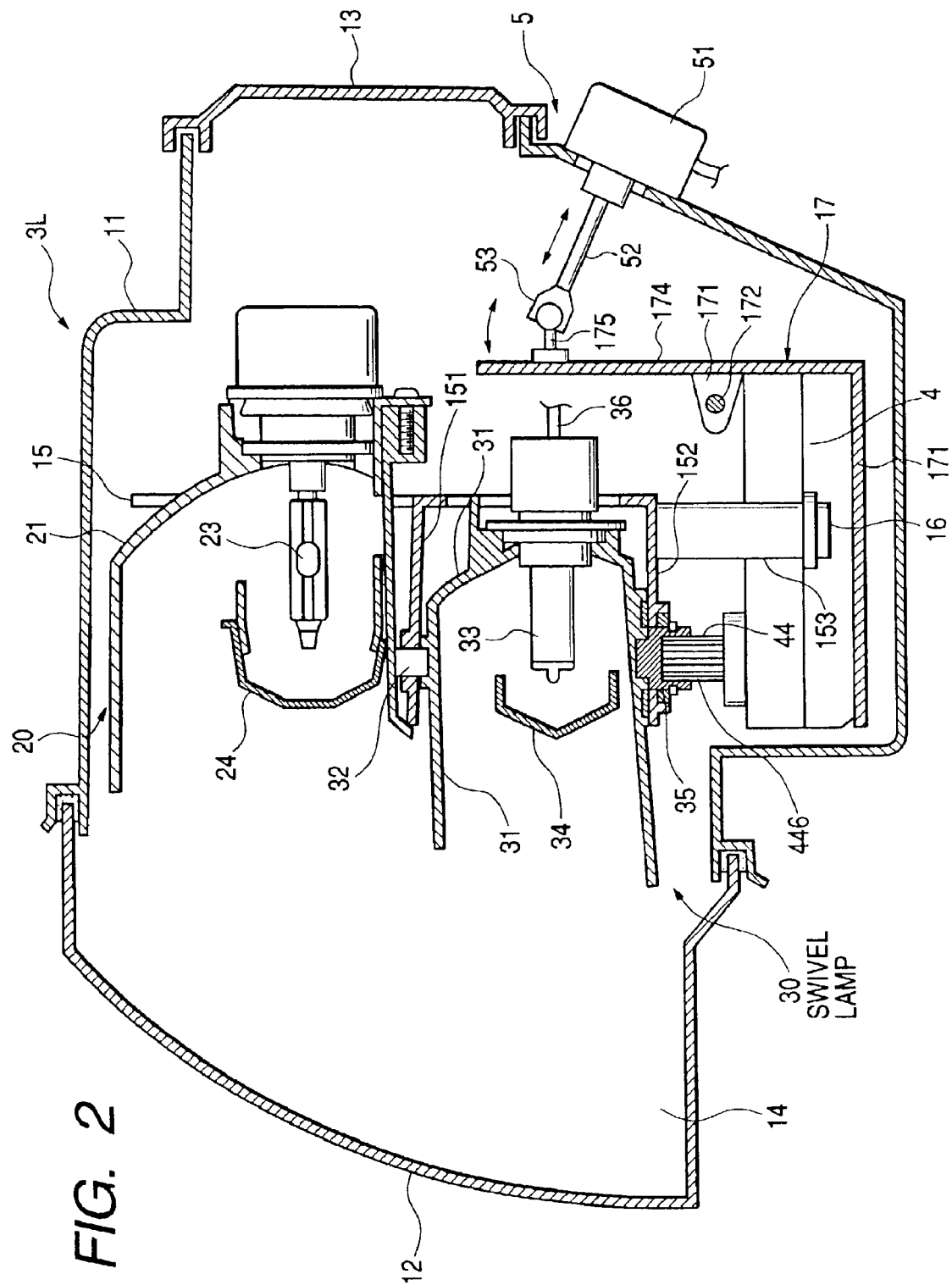
FIG. 2 is a longitudinal sectional view showing a swivel type lighting unit.
Figure 3:
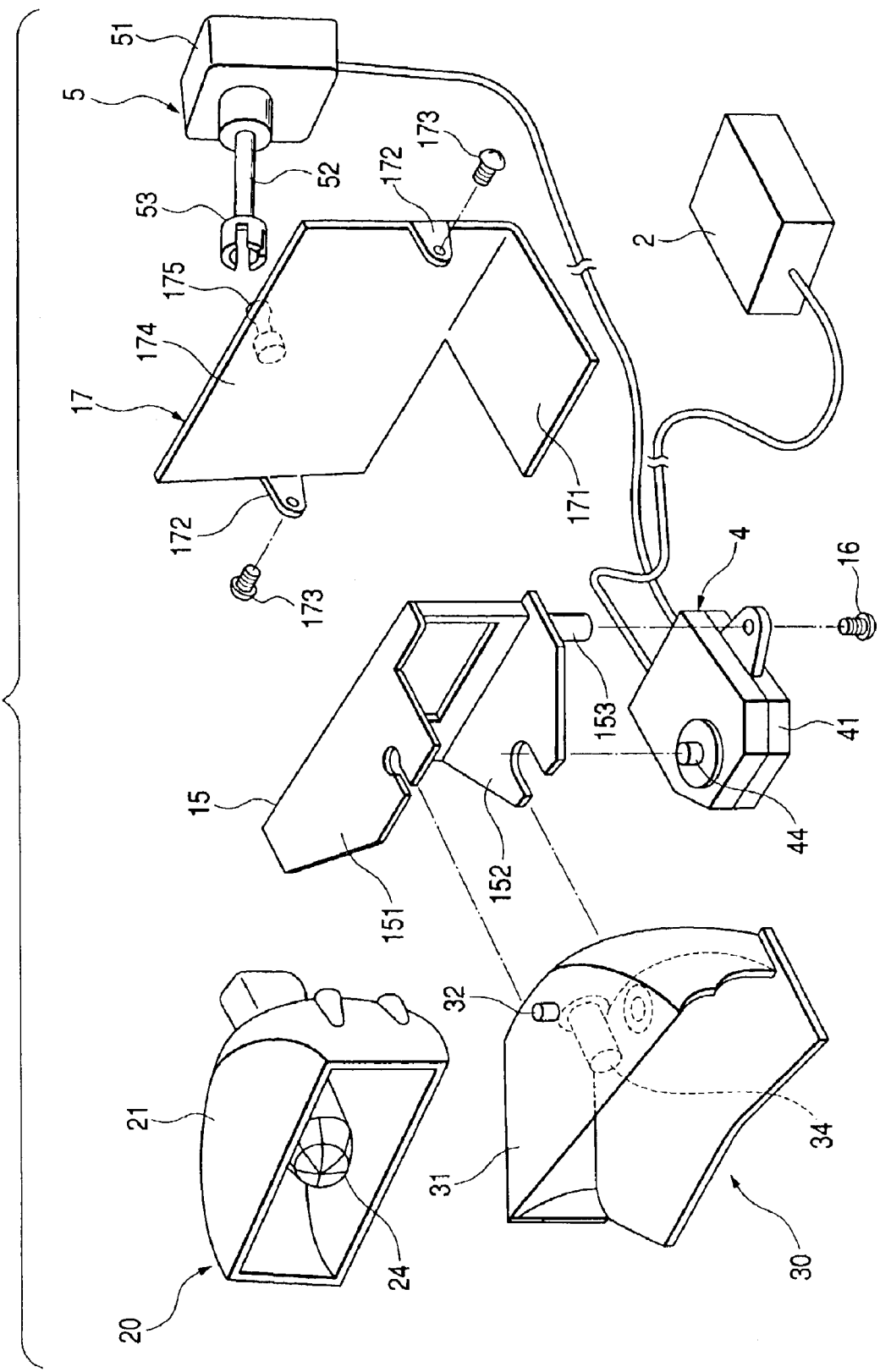
FIG. 3 is an exploded perspective view showing the internal structure of the swivel type lighting unit.

Next, an embodiment of the invention will be described with reference to the drawings. FIG. 2 is a longitudinal sectional view showing a left lighting unit 3L of a headlamp constituted by a swivel type lighting unit capable of deflecting an irradiating direction laterally and vertically in the components of an AFS to be lamp deflection angle control means according to the invention illustrated in FIG. 1, and FIG. 3 is a partial exploded perspective view showing an internal structure thereof. A lighting unit body 11 has a lens 12 attached to a front opening and a cover 13 attached to a rear opening, thereby forming a housing 14. In the housing 14, a fixed reflector 21 is attached to an upper region and a swivel reflector 31 is provided in a lower region. The fixed reflector 21 is fixed into the lighting unit body 11 with a screw which is not shown and a discharge bulb 23 is attached into the fixed reflector 21 together with a shade 24, thereby constituting a fixed lamp 20 having a predetermined light distribution characteristic in the forward direction of a car. The swivel reflector 31 is interposed between an upper plate 151 and a lower plate 152 of a support bracket 15 provided in the lighting unit body 11, and is fitted and supported rotatably in a horizontal direction around a spindle 32 protruded from the upper surface of the swivel reflector 31, and a halogen bulb 33 is attached therein together with a shade 34. Moreover, an actuator 4 to be driven by an ECU 2 shown in FIG. 1 is fixed and supported, with a screw 16, to a stem 153 protruded downward from the lower surface of the support bracket 15 below the lower plate 152 of the support bracket 15. A rotation output shaft 44 of the actuator 4 is coupled to a bearing section 35 provided on the lower surface of the swivel reflector 31 in a coaxial position with the spindle 32 and the swivel reflector 31 is rotated in a horizontal direction by the rotating force of the rotation output shaft 44, thereby constituting a swivel lamp 30 capable of deflecting an irradiating direction laterally.

Moreover, a tilt bracket 17 which is curved to have an almost L-shape in a vertical direction is provided in the lighting unit body 11, and the swivel lamp 30, that is, the actuator 4 and the swivel reflector 31, and the support bracket 15 are mounted on a bottom plate 171. The tilt bracket 17 has a support piece 172 provided in both side positions close to a lower part which is supported in the lighting unit body 11 with a bolt-shaped horizontal shaft 173, and can be tilted in a vertical direction. Moreover, a tilting shaft 175 having a spherical tip is protruded rearward from a part of a back face which is close to an upper part of a back plate 174 of the tilt bracket 17.

A leveling mechanism 5 is provided in the lower region of the lighting unit body 11 and can tilt the tilt bracket 17 in a vertical direction. The leveling mechanism 5 includes a leveling actuator 51 having a leveling shaft 52 protruded forward, and the leveling actuator 51 is fixed to the back face of the lighting unit body 11 in such a state that the leveling shaft 52 is protruded into the internal surface of the lighting unit body 11. Moreover, a ball bearing section 53 is provided in the tip portion of the leveling shaft 52 and is fitted and coupled to the ball portion of the tilting shaft 175 protruded rearward from the tilt bracket 17. The leveling mechanism 5 uses, as a driving source, a leveling motor (not shown) provided in the leveling actuator 51. When the leveling motor is rotated, the leveling actuator 51 expands and contracts the leveling shaft 52 in a longitudinal direction thereof. Consequently, the ball bearing section 53 of the leveling shaft 52 is operated longitudinally in the lighting unit body 11. By the longitudinal operation, the tilt bracket 17 is operated longitudinally together with the tilting shaft 175. As a result, the tilt bracket 17 is tilted in a vertical direction around a horizontal shaft 173. Accordingly, the optical axis of the swivel lamp 30 is deflected in a vertical direction together with the tilt bracket 17.

Figure 4:
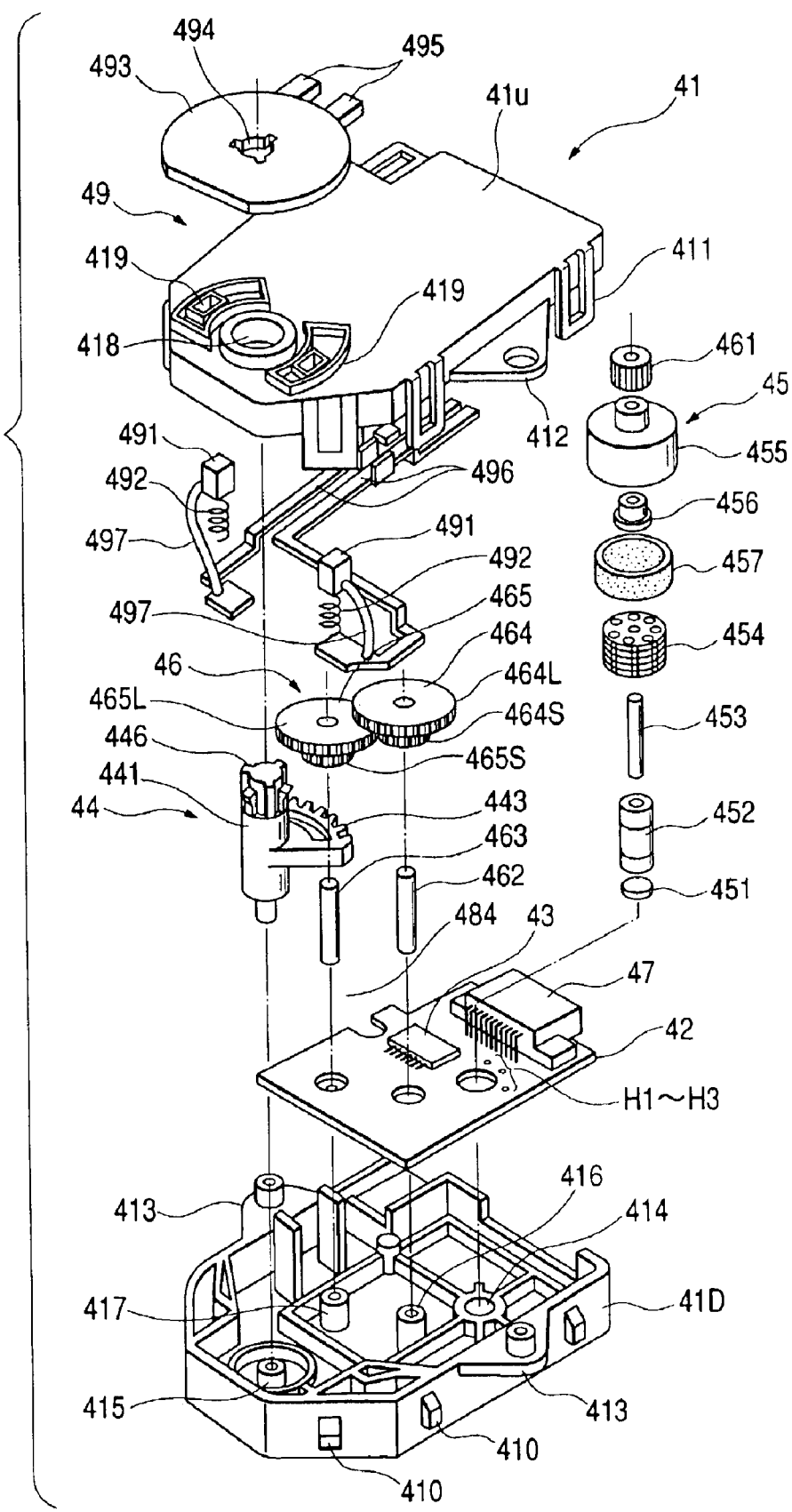
FIG. 4 is a partial exploded perspective view showing an actuator.
Figure 5:
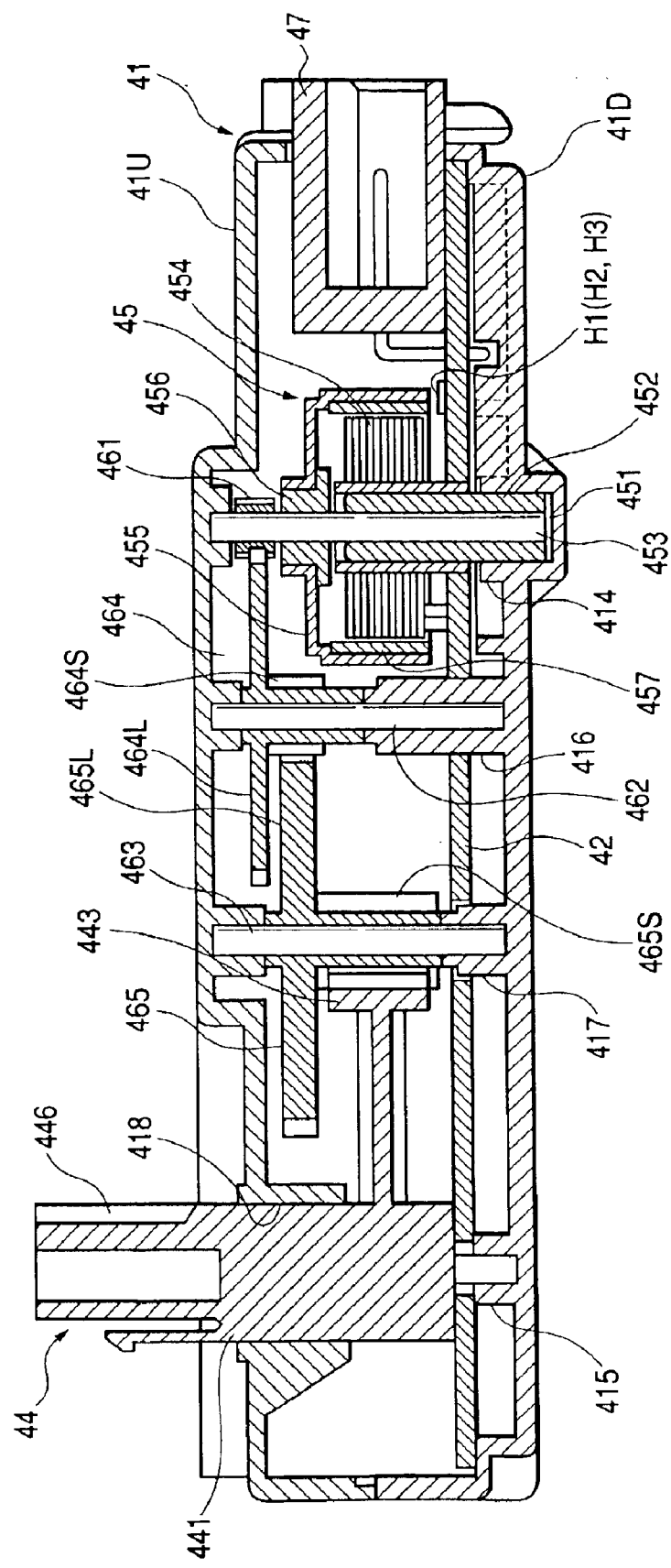
FIG. 5 is a longitudinal sectional view showing the actuator.

FIG. 4 is an exploded perspective view showing the main part of the actuator 4 for swiveling the swivel lamp 30 (a simple term of "actuator" will denote the actuator), and FIG. 5 is a longitudinal sectional view showing an assembly state thereof A case 41 is constituted by a lower half 41D and an upper half 41U, and a projection 410 of the lower half 41D and a fitting piece 411 of the upper half 41U are fitted in each other. Moreover, support pieces 412 and 413 for supporting the fixed bracket 15 are protruded toward both sides in the upper half 41U and the lower half 41D, respectively. A printed board 42 is provided in the case 41, and mounts an electronic component 43 to be a control circuit which will be described below, the rotation output shaft 44 for directly rotating the swivel reflector 31, a brushless motor 45 to be a driving source for rotating the rotation output shaft 44, and a reduction gear mechanism 46 for transmitting the rotating force of the brushless motor 45 to the rotation output shaft 44. Moreover, the printed board 42 is provided with a connector 47 to which a vehicle power cord (not shown) for supplying a power to the brushless motor 45 and the halogen lamp 33 of the swivel lamp 30 respectively is connected. Moreover, the upper surface of the upper half 41U is provided with a movable contact mechanism 49 for electrically connecting the actuator 4 to a cord 36 of the halogen lamp 33.

Figure 6:
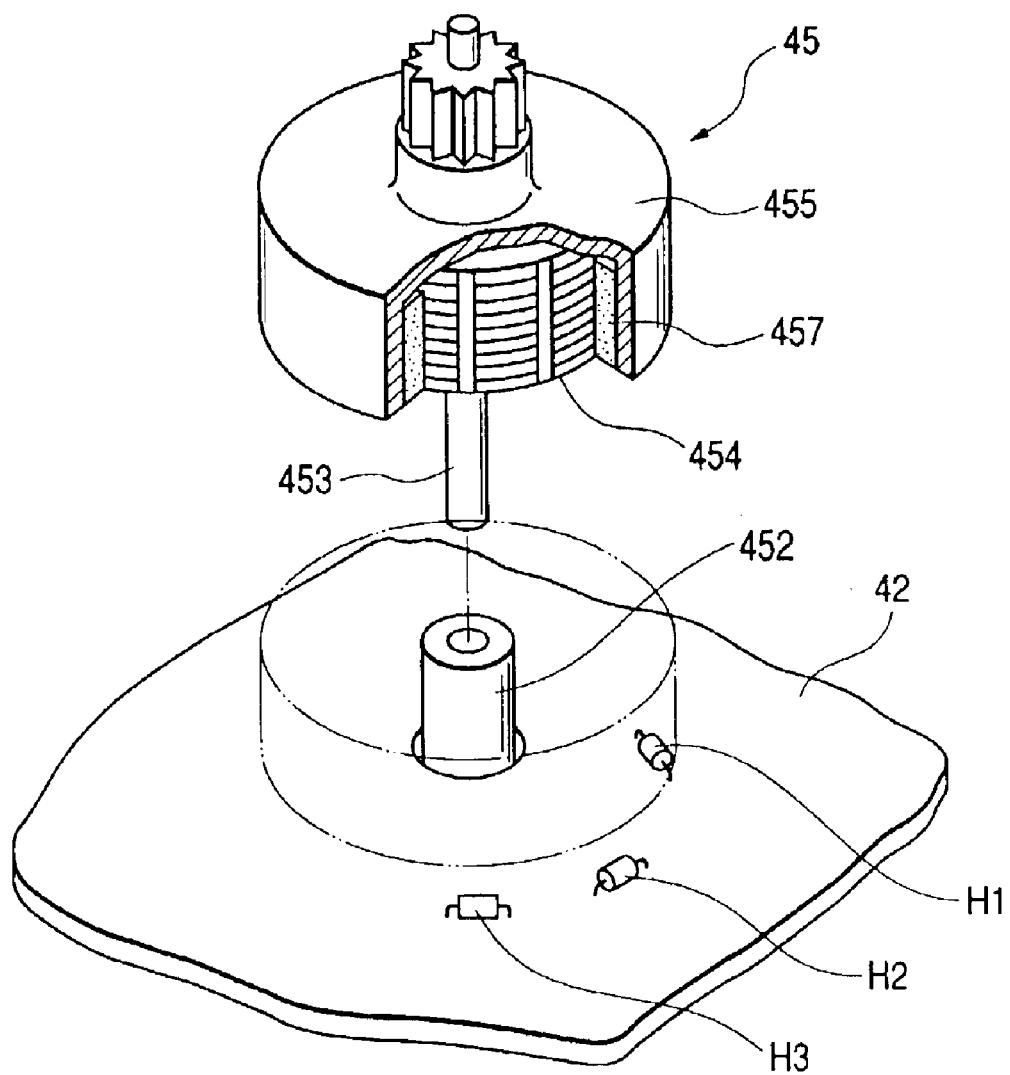
FIG. 6 is an enlarged perspective view showing a part of a brushless motor.

As shown in a perspective view of FIG. 6, a part of which is taken away, the brushless motor 45 includes a rotating shaft 453 supported axially and rotatably on a boss hole 414 of the lower half 41D through a thrust bearing 451 and a bearing sleeve 452, a stator coil 454 fixed and supported on the printed board 42 around the rotating shaft 453, and a cylindrical vessel-shaped rotor 455 fixed to the rotating shaft 453 and covering the stator coil 454. The rotor 455 is fixed to the rotating shaft 453 through a rotor boss 456 and has a cylindrical rotor magnet 457 integrated with an internal surface. The stator coil 454 is constituted by three pairs of coils arranged at a regular interval in a circumferential direction. A power is supplied to each pair of coils through a printed wiring (not shown) of the printed board 42 and they are alternately magnetized to S and N poles in the circumferential direction by the supply of the power. The rotor magnet 457 is alternately magnetized to the S and N poles in the circumferential direction corresponding to the stator coil 454. In the brushless motor 45, alternating currents having different phases, that is, three-phase alternating currents are supplied to the three coils of the stator coil 454 to rotate the rotor magnet 457, that is, the rotor 455 and the rotating shaft 453. As shown in FIG. 6, furthermore, a plurality of, that is, three hole elements H1, H2 and H3 are arranged and supported on the printed board 42 at a predetermined interval in the circumferential direction of the rotor 455. When the rotor magnet 457 is rotated together with the rotor 455, a magnetic field in each of the hole elements H1, H2 and H3 is changed so that the ON/Off state of the hole elements H1, H2 and H3 is changed to output a pulse signal corresponding to the rotation period of the rotor 455.

The reduction gear mechanism 46 is provided in a region between the brushless motor 45 and the rotation output shaft 44. The reduction gear mechanism 46 includes a driving gear 461 attached to a rotating shaft 453 of the brushless motor 45, and a first gear 464 and a second gear 465 which are pivotally supported rotatably on two fixed shafts 462 and 463 penetrating through the printed board 42 and erected at a predetermined interval in boss holes 416 and 417 of the lower half 41D. The first gear 464 and the second gear 465 have large diameter gears 464L and 465L and small diameter gears 464S and 465S integrated with each other, and the driving gear 461 is engaged with the large diameter gear 464L of the first gear 464 and the small diameter gear 464S of the first gear 464 is engaged with the large diameter gear 465L of the second gear 465. Furthermore, the rotation output shaft 44 has a rotating shaft section 441 directly supported pivotally in the case 41 with an upper end 446 protruded from the upper surface side of the case 41, and has a sector gear 443 provided integrally in a part in the longitudinal direction of the rotating shaft section 441. The second gear 465 is engaged with the sector gear 443. Consequently, the rotating force of the brushless motor 45 is reduced by the reduction gear mechanism 46 and is thus transmitted to the sector gear 443, thereby decelerating and rotating the rotation output shaft 44. The upper end of the rotation output shaft 44 is formed to be the spline shaft 446, and penetrates through an output shaft hole 418 opened on the upper half 41U and is protruded from the upper surface side of the case 41, and is fitted in a spline groove of the bearing section 35 provided on the lower surface of the swivel reflector 31. Thus, the swivel reflector 31 is integrally rotated by the rotating force of the rotation output shaft 44.

The movable contact mechanism 49 provided on the upper surface of the upper half 41U includes a pair of contact brushes 491 provided in the case 41, exposed through a pair of rectangular holes 419 on a circumference which are opened on the upper surface of the upper half 41U and energized in the direction of protrusion by means of a spring 492, and a contact plate 493 having a spline shaft hole 494 in which the spline shaft 446 of the rotation output shaft 44 is to be fitted, integrated with the rotation output shaft 44 in a rotating direction and rotated in the upper region of the contact brush 491. The contact plate 493 has a pair of contact pieces (not shown) extended over a lower surface in sliding contact with the contact brush 491, and can be rotated together with the rotation output shaft 44 in such a state as to maintain an electric contact with the contact brush 491. Moreover, the contact plate 493 is provided with an electrode terminal 495 to be coupled to the contact piece, and a connector (not shown) of the cord 36 connected to the halogen lamp 33 of the swivel lamp 30 shown in FIG. 2 can be attached to and removed from the electrode terminal 495. Moreover, the pair of contact brushes 491 are connected through a conductive wire 497 to one of the ends of each of a pair of conductive plates 496 having a line width which are extended in the case 41, respectively, and are electrically connected to a vehicle power supply (not shown) through a connector (not shown) to be connected to the other ends of the conductive plates 496. Consequently, the movable contact mechanism 49 electrically connects the halogen lamp 33 to the vehicle power supply, and prevents the cord 36 connecting the swivel lamp 30 and the actuator 4 from being twisted when the swivel reflector 31 of the swivel lamp 30 is moved. Thus, the smooth rotating operation of the swivel reflector 31 can be maintained.

Figure 7:
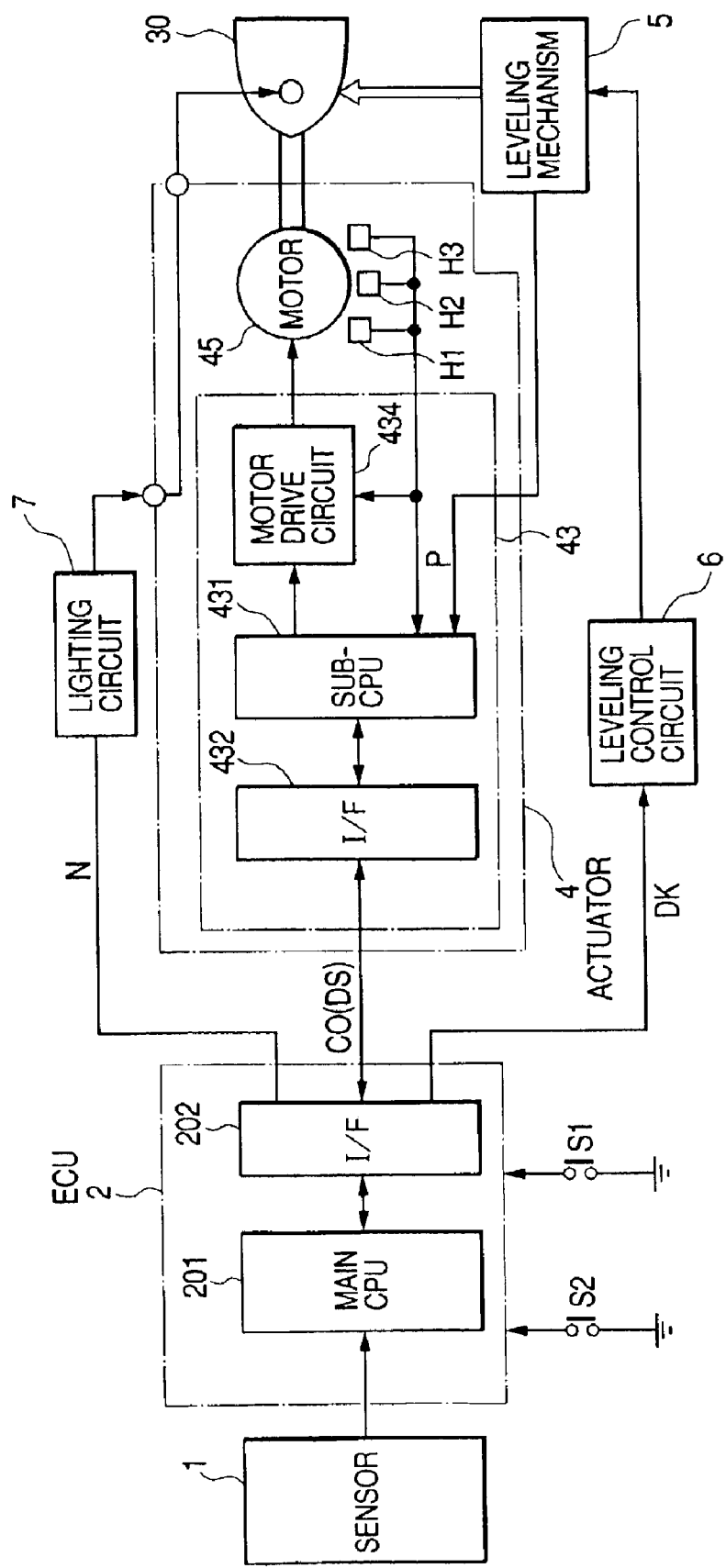
FIG. 7 is a block circuit diagram showing the circuit structure of the AFS.

FIG. 7 is a block circuit diagram showing the structure of the electric circuit of a lighting system including the ECU 2, the actuator 4 and the leveling mechanism 5. The actuator 4 and the leveling mechanism 5 are provided in left and right swivel type lighting units 3L and 3R of a car respectively and can carry out a two-way communication together with the ECU 2. The ECU 2 includes a main CPU 201 for executing a processing in a predetermined algorithm based on information sent from the sensor 1 and outputting a predetermined control signal C0, and an interface (hereinafter referred to as an I/F) circuit 202 for inputting and outputting the control signal C0 between the main CPU 201 and the actuator 4. Moreover, ON/OFF signals of a lighting switch S1 provided in the car can be input to the ECU 2, and a lighting circuit 7 is controlled in response to a control signal N based on the ON/OFF operation of the lighting switch S1 to turn ON/OFF both of the swivel type lighting units 3R and 3L or both of the swivel lamps 30. Moreover, it is apparent that the connection state of the electric circuits with the power supply is turned ON/OFF by means of an ignition switch S2 for turning ON/OFF an electrical system provided in a car.

Furthermore, a control circuit 43 constituted by an electronic component accommodated in the actuator 4 provided in each of the swivel lamps 30 of the left and right swivel type lighting units 3L and 3R in the car includes an I/F circuit 432 for inputting and outputting a signal from and to the ECU 2, a sub CPU 431 for carrying out a processing in a predetermined algorithm based on a signal input from the I/F circuit 432 and a pulse signal P output from each of the hole elements H1, H2 and H3, and a motor drive circuit 434 for rotating the brushless motor 45. A lateral deflection angle signal DS of the swivel lamp 30 is output as a part of the control signal C0 from the ECU 2 and is input to the actuator 4.

Moreover, the main CPU 201 of the ECU 2 is connected to a leveling control circuit 6 for controlling the driving operation of the leveling mechanism 5 through the I/F circuit 202. When a vertical deflection angle signal DK is output from the CPU 201 toward the leveling control circuit 6, the leveling control circuit 6 can deflect the optical axis of the swivel lamp 30 in a vertical direction by means of the leveling mechanism 5.

Figure 8:
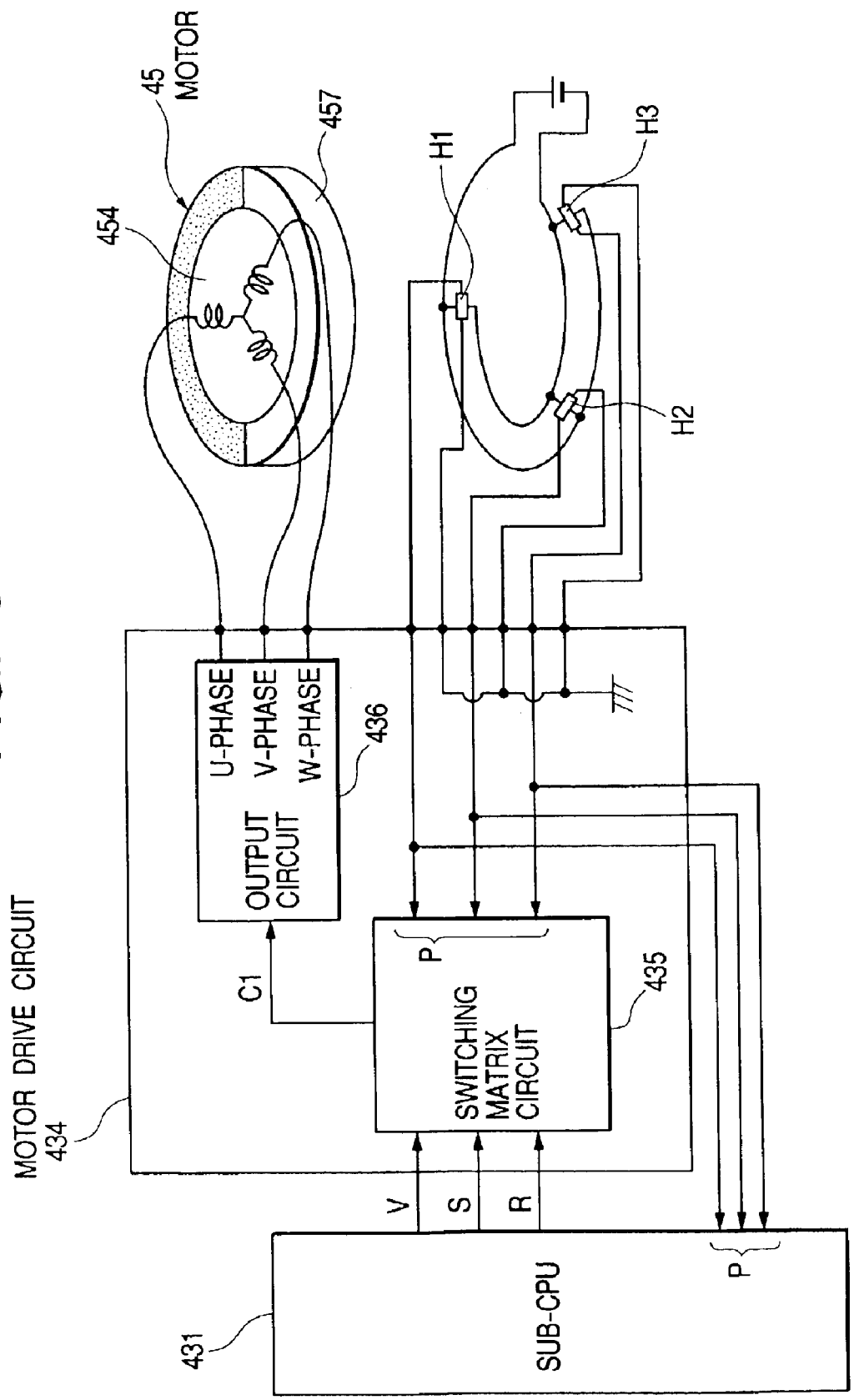
FIG. 8 is a circuit diagram showing the circuit structure of the actuator.

Furthermore, FIG. 8 is a circuit diagram typically showing the motor drive circuit 434 and the brushless motor 45 in the actuator 4. There are provided a switching matrix circuit 435 for inputting a speed control signal V, a start and stop signal S and a normal and reverse rotation signal R as control signals from the sub CPU 431 of the actuator 4 respectively and for inputting a pulse signal from each of the three hole elements H1, H2 and H3, and an output circuit 436 for regulating the phases of three-phase powers (U phase, V phase and W phase) to be supplied to three pairs of coils of the stator coil 454 in the brushless motor 45 upon receipt of the output of the switching matrix circuit 435. In the motor drive circuit 434, the powers having U, V and W phases are supplied to the stator coil 454 so that the magnet rotor 457 is rotated and the rotor 455 and the rotating shaft 453 which are provided integrally therewith are thus rotated.

When the magnet rotor 457 is rotated, the hole elements H1, H2 and H3 detect a change in a magnetic field and output the pulse signal P. The pulse signal P is input to the switching matrix circuit 435 and the switching matrix circuit 435 carries out a switching operation in the output circuit 436 in the timing of the pulse signal. Consequently, the rotation of the magnet rotor 457 is continuously carried out. Moreover, the switching matrix circuit 435 outputs a predetermined control signal C1 to the output circuit 436 based on the speed control signal V, the start and stop signal S, and the normal and reverse rotation signal R which are sent from the sub CPU 431, and the output circuit 436 regulates the phases of the three-phase powers to be supplied to the stator coil 454 upon receipt of the control signal C1, thereby controlling the start and stop of the rotating operation, the rotating direction and the rotating speed of the brushless motor 45. A part of the pulse signal P output from each of the hole elements H1, H2 and H3 is input to the sub CPU 431 to recognize the rotating state of the brushless motor 45. Referring to the leveling motor provided in the leveling actuator 51 of the leveling mechanism 5, in the same manner as in FIG. 8, a hole element to be a detector for detecting a rotation state is provided and is electrically connected to the sub CPU 431, which is neither shown nor described in detail.

According to the structure described above, information about the steering angle of a steering wheel SW of a car, the speed of the car and the running situation of the car are input to the ECU 2 from the sensor 1 provided in the car as shown in FIG. 1 in a state in which the ignition switch S2 is turned ON and the lighting switch S1 is turned ON, the ECU 2 carries out an operation in the main CPU 201 based on the sensor output thus input and calculates the lateral deflection angle signal DS of the swivel lamp 30 in each of the swivel type lighting units 3R and 3L of the car, and inputs the same lateral deflection angle signal DS to the actuator 4 of each of the swivel type lighting units 3R and 3L. In the actuator 4, the sub CPU 431 carries out an operation in response to the lateral deflection angle signal DS thus input, and calculates a signal corresponding to the lateral deflection angle signal DS and outputs the same signal to the motor drive circuit 434, thereby rotating the brushless motor 45. The rotating force of the brushless motor 45 is reduced by the reduction gear mechanism 46 and is transmitted to the rotation output shaft 44. Consequently, the swivel reflector 31 coupled to the rotation output shaft 44 is rotated in a horizontal direction so that the direction of the optical axis of the swivel lamp 30 is deflected laterally. In the rotating operation of the swivel reflector 31, the deflection angle of the swivel reflector 31 is detected from the rotating angle of the brushless motor 45. More specifically, as shown in FIG. 8, the sub CPU 431 detects the deflection angle based on the pulse signals P (P1, P2, P3) output from the three hole elements H1, H2 and H3 provided in the brushless motor 45. Furthermore, the sub CPU 431 compares the detection signal of the deflection angle thus detected with the lateral deflection angle signal DS input from the ECU 2, and feedback controls the rotating angle of the brushless motor 45 such that both of them are coincident with each other. Consequently, the direction of the optical axis of the swivel reflector 31, that is, the direction of the optical axis of the swivel lamp 30 can be controlled with high precision into a deflecting position set in response to the lateral deflection angle signal DS.

By the deflecting operation of the swivel lamp 30, a light emitted from the fixed lamp 20 in the straight running direction of the car and a deflected light emitted from the swivel lamp 30 are integrated in both of the swivel type lighting units 3R and 3L, thereby illuminating a region turned in a lateral direction which is deflected from the straight running direction of the car. During the running of the car, therefore, it is possible to illuminate a forward part in a steering direction as well as the straight running direction of the car. Thus, a safety drivability can be enhanced.

In the AFS, the deflection angle of the swivel lamp 30 is detected based on the pulse signals P of the hole elements H1, H2 and H3 of the brushless motor 45. In this case, the deflection angle of the swivel lamp 30 is obtained by setting a predetermined angle position, for example, an angle position turned in a straight running state to be a reference position and detecting the amount of the rotation of the brushless motor 45 from a rotating position corresponding to the reference position. For this reason, if the ignition switch S2 is turned OFF and a power supply path is thus blocked when the swivel lamp 30 is not placed in the reference position, it is impossible to know the position having any deflection angle in which the swivel lamp 30 is placed when the ignition switch S2 is turned ON again. Therefore, it is impossible to carry out the deflecting control of the swivel lamp 30. Moreover, if the deflecting operation of the swivel lamp 30 can be carried out when the lighting switch S1 is turned OFF and the swivel lamp 30 is put out during the day, the operation for deflecting the swivel lamp 30 is continuously carried out following a change in the steering angle of the car. Consequently, a mechanism section including the actuator 4 is damaged earlier and the durability of the device has a drawback, and furthermore, a power is wasted.

In the invention, therefore, when the ignition switch S2 is turned ON, the swivel lamp 30 is initialized and is set into the reference position. Consequently, when the ignition switch S2 is turned ON, the swivel lamp 30 is always set into the reference position. Therefore, if the rotating angle of the brushless motor 45 is detected by the hole elements H1, H2 and H3 based on the same position, the control of the AFS can be carried out with high precision. In the invention, moreover, the swivel lamp 30 is set into the reference position also when the lighting switch S1 is turned OFF. Consequently, the deflecting operation of the swivel lamp 30 is stopped in the reference position irrespective of the steering of the car in a state in which the lighting switch S1 is turned OFF and the swivel lamp 30 is put out. Thus, it is possible to eliminate the drawback in the durability of the device.

Figure 9:
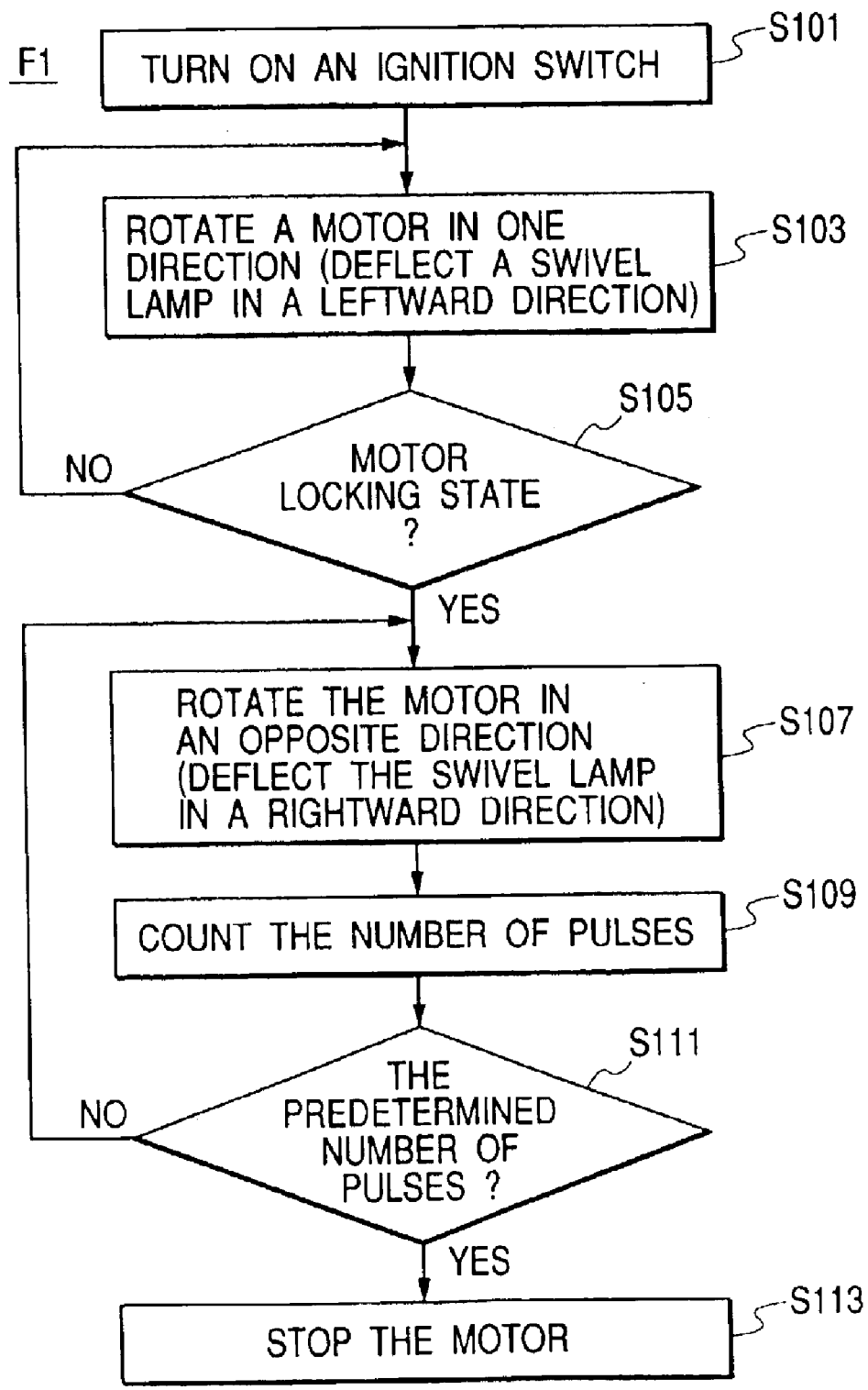
FIG. 9 is a flowchart for an initialization flow to set a reference position when turning ON an ignition switch.
Figure 10:
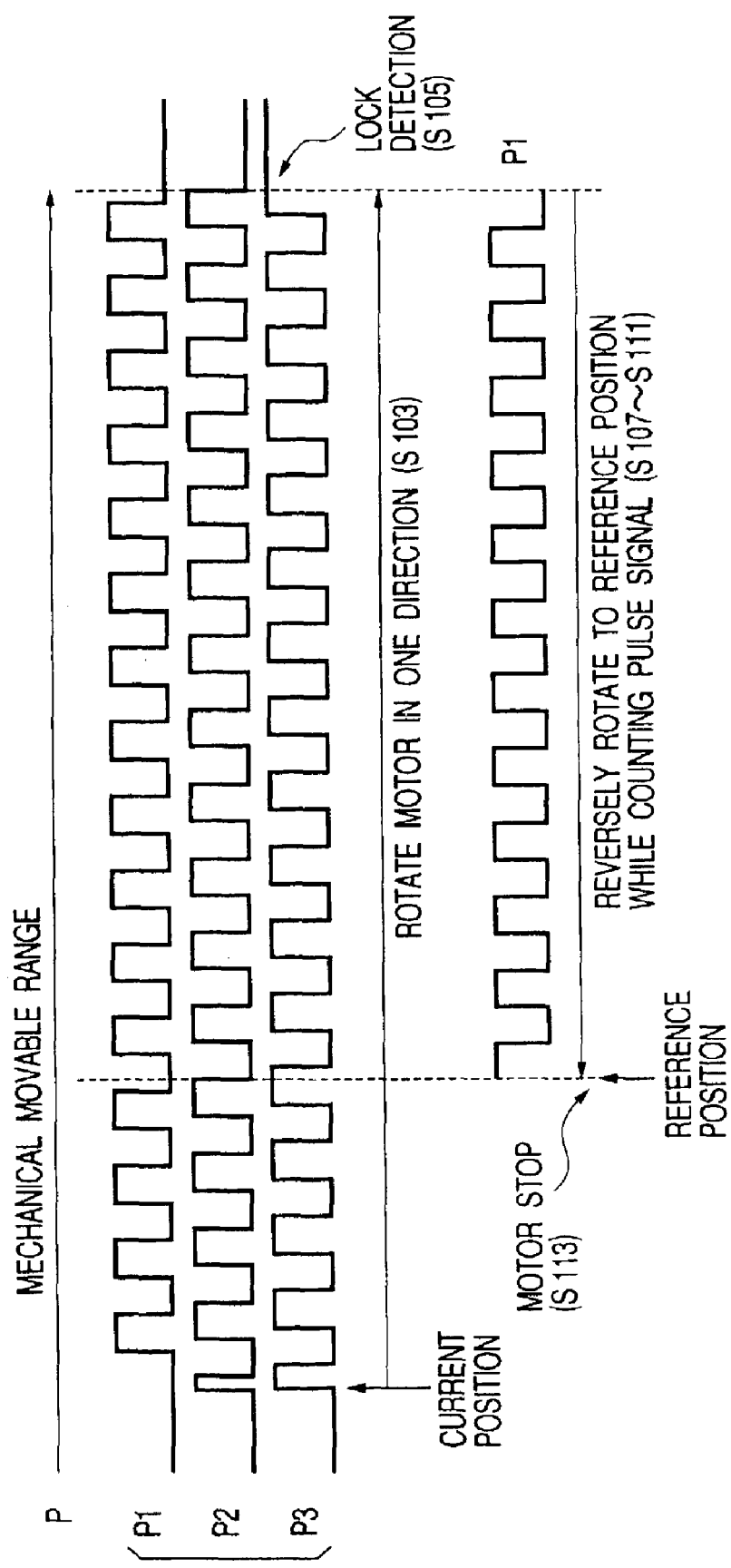
FIG. 10 is a diagram showing a pulse waveform for explaining an initializing operation.

FIG. 9 is a flowchart for explaining an initialization flow F1 to set the lateral deflection angle of the swivel lamp 30 into the reference position when the ignition switch is turned ON. Moreover, FIG. 10 is a waveform diagram showing the pulse signals P (P1, P2, P3) output from the three hole elements H1, H2 and H3 provided in the brushless motor 45. When the ignition switch S2 is turned ON (S101), the motor drive circuit 434 continuously rotates the brushless motor 45 forcibly in one direction to the end of movable range in response to a reference position set signal sent from the sub CPU 431 (S103). In the rotating direction, a car running in an opposite direction is not dazzled when the swivel lamp 30 is deflected, and the same rotating direction indicates a left direction in Japan to keep left. The rotating force of the rotating shaft 453 of the brushless motor 45 is transmitted to the rotation output shaft 44 through the reduction gear mechanism 46 so that the sector gear 443 provided integrally with the rotation output shaft 44 is rotated. The engagement of the sector gear 443 with the small diameter gear 465S of the second gear 465 on one of ends in the rotating direction is set into a locking state and the rotation is not carried out any more. When the locking state is brought, the brushless motor 45 is also brought into a state in which the rotation is locked, and the pulse signals P (P1, P2, P3) sent from the hole elements H1, H2 and H3 are fixed to have a constant level. Therefore, the sub CPU 431 recognizes that the brushless motor 45 is set in the locking state (S105).

Next, the sub CPU 431 sends a reverse rotation signal to the motor drive circuit 434 to start to rotate the brushless motor 45 in a reverse direction (S107). More specifically, the swivel lamp 30 is deflected in a rightward direction. At the same time, the number of pulses of the pulse signal P1 sent from at least one of the hole elements H1, H2 and H3, that is, the hole element H1 is counted (S109). When the predetermined number of pulses is counted (S111), the rotation of the brushless motor 45 is stopped (S113). The number of pulses is set such that the optical axis of the swivel lamp 30 is turned in the straight running direction of a car or is placed in the reference position having a preset reference angle corresponding to the number of rotations of the brushless motor 45. By the operation for setting a reference position, therefore, the optical axis of the swivel lamp 30 is fixed into the set reference position. While the swivel lamp 30 is thus deflected to have a maximum deflection angle in one direction in the setting of the reference position of the swivel lamp 30, this direction is opposite to an opposite lane and a car running in the opposite direction can be therefore prevented from being dazzled. In Europe and America to keep right, the swivel lamp 30 is deflected to have a maximum deflection angle in the rightward direction, and is then rotated by a predetermined angle in a leftward direction and is thus set into the reference position.

FIG. 13(a) is a light distribution characteristic chart for explaining the above operation, illustrating a condition in which a rotation is carried out from a deflecting position of P1 toward the left side until a locking state is brought, thereby reaching a deflecting position of P2, and the rotation is carried out from the same position toward the right side by a predetermined angle, thereby reaching a reference position of P3.

After the initialization is completed, the sub CPU 431 in the actuator 4 calculates a difference between the angle signal DS corresponding to the current steering angle of the steering wheel SW which is input from the ECU 2 and a current deflection angle signal detected by the sub CPU 431, and outputs, to the motor drive circuit 434, such a signal that the difference is zero, thereby rotating the brushless motor 45. Consequently, the swivel reflector 31 is rotated to have such an angle as to follow the steering angle of the steering wheel and the direction of the optical axis of the swivel lamp 30 is set to have a deflection angle corresponding to the steering angle. More specifically, the direction of the optical axis of the swivel lamp 30 is controlled by the AFS following a further steering operation of the steering wheel SW. Thus, when the ignition switch S2 is turned ON, the swivel lamp 30 can be always set into a reference position and the control of the AFS can be executed with high precision.

Figure 11:
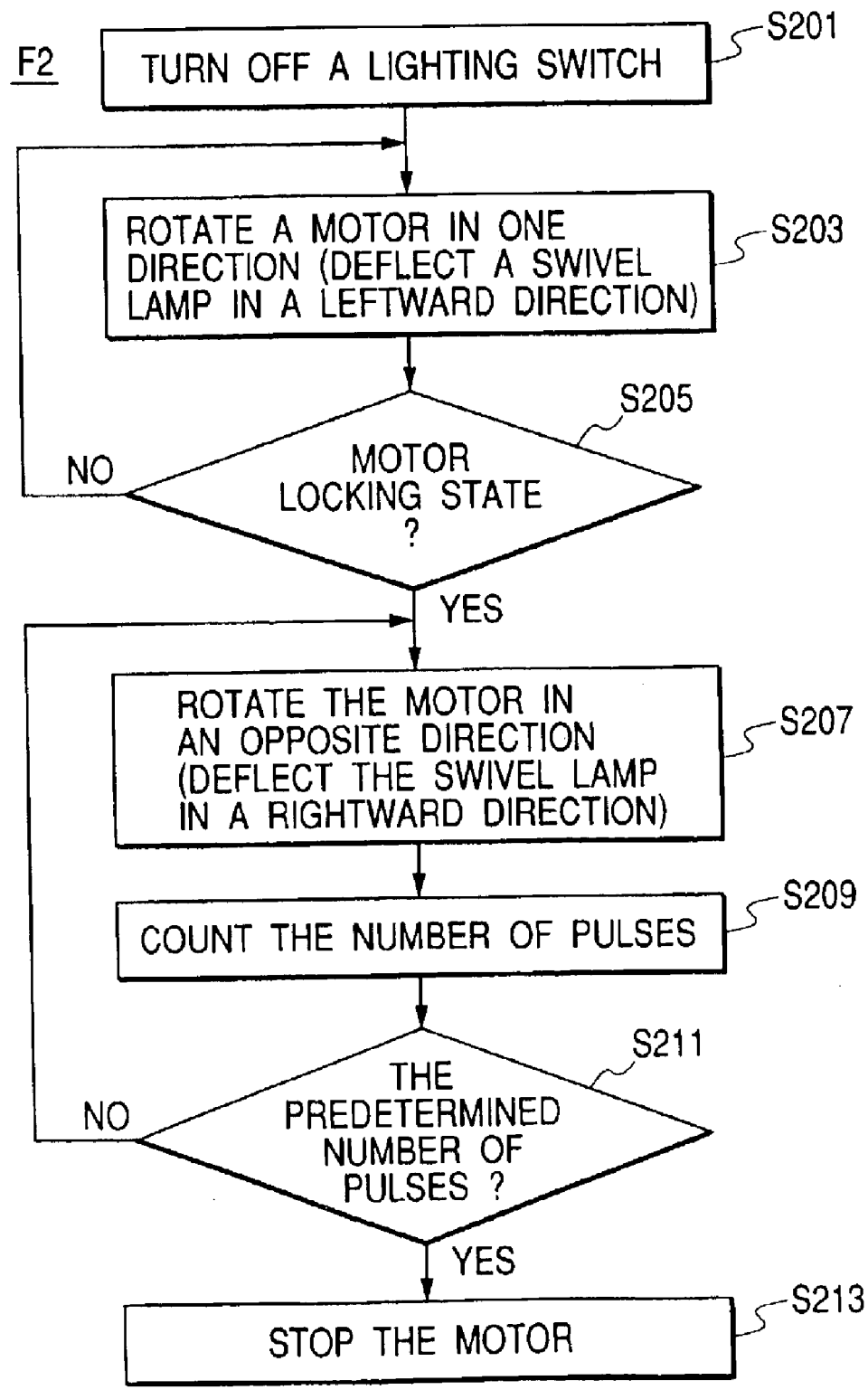
FIG. 11 is a flowchart for an initialization flow to be executed when a lighting switch is turned OFF.

FIG. 11 is a flowchart for an initialization flow F2 to set the lateral deflection angle of the swivel lamp 30 into the reference position when the lighting switch S1 is turned OFF. The operation is basically the same as that in the case in which the ignition switch S2 is turned ON. More specifically, when the lighting switch S1 is turned OFF (S201), the brushless motor 45 is rotated in one direction (S203). In this case, the swivel lamp 30 is put out. Therefore, the direction may be any of left and right. However, the lighting switch S1 might be turned ON to light up the swivel lamp 30 in the middle. In order to prevent the car running in the opposite direction from being dazzled, therefore, it is preferable that a left direction should be selected to keep left and a right direction should be selected to keep right in the same manner as in FIG. 9. When a motor locking state is detected (S205), the brushless motor 45 is rotated in the opposite direction (S207) and the number of pulse signals sent from the hole elements H1 to H3 is counted (S209). When a predetermined number is counted (S211), the rotation of the brushless motor 45 is stopped (S213).

Consequently, when the lighting switch S1 is turned OFF, the swivel lamp 30 is maintained to be stopped in the reference position even if the steering is carried out by the steering wheel SW. When the lighting switch S1 is turned ON again so that the swivel lamp 30 is lighted up, the optical axis of the swivel lamp 30 is placed in the reference position in the straight running direction, for example, and the car running in the opposite direction can be therefore prevented from being dazzled. After the ON operation, the deflection control is carried out again in conformity to the steering angle of the steering wheel SW by the AFS. Thus, when the swivel type lighting units 3R and 3L are turned OFF, the lateral deflecting operation of the swivel lamp 30 is stopped. Consequently, the devices in the actuator and the leveling mechanism can be prevented from being damaged and a lifetime can be prolonged.

FIG. 12 is a flowchart showing a variant of the initialization flow, taking, as an example, an initialization flow F3 for initializing the vertical deflecting operation of the swivel type lighting units 3R and 3L simultaneously with the lateral deflecting operation of the swivel lamp 30. When the ignition switch S2 is turned ON (S301), the leveling control circuit 6 drives the leveling motor provided in the leveling actuator 51 of the leveling mechanism 5 to tilt the bracket 17 in a vertical downward direction (S303). Then, the bracket 17 is moved to a lowermost position so that the leveling motor is brought into a locking state (S305), and the pulse signal sent from the hole element of the leveling motor is not changed. Therefore, when detecting no change, the sub CPU 431 stops the rotation of the leveling motor (S307). Thereafter, the initialization flow F1 or F2 in the lateral direction is executed to set the swivel lamp 30 into a predetermined position in the lateral direction, that is, a position placed below the reference position. Furthermore, the sub CPU 431 rotates the leveling motor in an opposite direction to deflect the bracket 17 in a vertical upward direction by a predetermined angle (S309). Also at this time, the sub CPU 431 counts the number of pulses of a pulse signal sent from a detector for detecting the amount of the rotation of the leveling motor, for example, the hole element, thereby detecting the amount of the rotation (S311), and a tilting operation is carried out by a predetermined angle (S313) and the leveling motor is stopped (S315). Consequently, the whole optical axes of the swivel type lighting units 3R and 3L including the swivel lamp 30 can be set into the reference position. Subsequently, the operation for deflecting the swivel lamp 30 is carried out in conformity to the steering angle of the steering wheel SW in the same manner as in the embodiment described above. Moreover, the swivel type lighting units 3R and 3L are tilted in the vertical direction by the leveling mechanism 5 depending on the running condition of the car and control is executed in a preferred direction of the optical axis corresponding to the running condition.

FIG. 13(b) is a light distribution characteristic chart for explaining the above operation, in which tilting is carried out downward from a deflecting position of P1 to bring a locking state, thereby reaching a vertical deflecting position of P2, a rotation is then carried out toward the left side to bring the locking state, thereby reaching a lateral deflecting position of P3, the rotation is carried out toward the right side from the same position by a predetermined angle, thereby reaching a deflecting position of P4, and furthermore, tilting is carried out upward from the same position by a predetermined angle, thereby reaching a reference position of P5.

In the embodiment, when the ignition switch is turned ON, the swivel type lighting units 3R and 3L including the swivel lamp 30 are set into the reference positions in the lateral and vertical directions. Therefore, the lateral and vertical deflecting operations of the swivel type lighting units 3R and 3L can be subsequently carried out accurately, respectively. Moreover, when the lighting switch is simultaneously turned OFF, the lighting units can be maintained in the reference position. Consequently, a wasteful deflecting operation can be prevented and the lifetime of the device can be prolonged so that a reliability can be enhanced.

While the AFS using, as the swivel type lighting unit, the headlamp having the fixed lamp and the swivel lamp constituted integrally has been taken as an example in the embodiment, the swivel lamp may be constituted to be a single independent lighting unit and may be used as an auxiliary lamp and combined with the headlamp constituted by the fixed lamp, thereby forming the swivel type lighting unit.

The number of pulses may be counted for the pulse signal of any of the hole elements. Alternatively, the counting may be carried out for all the pulse signals. Moreover, the locking state of the motor can also be brought by detecting an increase in a motor current. Furthermore, in the case in which the period of the pulse signal is constant, that is, the rotating speeds of the brushless motor and the leveling motor are constant, it is also possible to time a reverse rotation from the locking state, thereby setting a reference direction. This method is effective for an application to a brushless motor having no hole element.

As described above, according to the invention, when the electrical system of a vehicle is turned ON so that the illumination of a vehicle can be carried out, the irradiating direction of a lamp is set into a reference position so that a car running in an opposite direction can be prevented from being dazzled by the illuminated light of the lamp when the lamp is turned ON again. By stopping a deflecting operation when turning OFF the lamp, moreover, the wasteful deflecting operation of the lamp can be avoided and the lifetime of the device can be prolonged to enhance a reliability.

What is claimed is:

1. A lighting system for a vehicle comprising lamp deflection angle control means for changing and controlling a lateral deflection angle in an irradiating direction of a lamp corresponding to a running situation of the vehicle, wherein the lamp deflection angle control means includes means for setting the irradiating direction of the lamp into a preset reference position when an electrical system is turned ON, wherein said deflection angle control means controls the swivel lamp, before said reference position is set, such that the swivel lamp is deflected to a maximum deflection angle in a direction opposite to an opposite lane, and rotated by a predetermined angle in an opposite direction of said direction.

2. The lighting system for a vehicle according to claim 1 comprising lamp deflection angle control means for changing and controlling a lateral deflection angle in an irradiating direction of a lamp corresponding to a running situation of the vehicle, wherein the lamp deflection angle control means includes means for setting the irradiating direction of the lamp into a preset reference position when the lamp is turned OFF.

3. The lighting system for a vehicle according to claim 2, wherein the lamp deflection angle control means includes means for setting the lamp into a reference position in a horizontal direction of the lamp or both of horizontal and vertical directions.

4. The lighting system for a vehicle according to claim 3, wherein said deflection angle control means controls the swivel lamp, before said reference position is set, such that the swivel lamp is; tilted down to a lowermost position in the vertical direction; deflected to a maximum deflection angle in a horizontal direction opposite to an opposite lane;

5. The lighting system for a vehicle according to claim 2, wherein said deflection angle control means controls the swivel lamp, before said reference position is set, such that the swivel lamp is deflected to a maximum deflection angle in a direction opposite to an opposite lane, and rotated by a predetermined angle in an opposite direction of said direction.

6. A lighting system for a vehicle comprising lamp deflection angle control means for changing and controlling a lateral deflection angle in an irradiating direction of a lamp corresponding to a running situation of the vehicle, wherein the lame deflection angle control means includes means for setting the irradiating direction of the lamp into a preset reference position when an electrical system is turned ON, wherein the lamp deflection angle control means includes means for setting the lamp into a reference position in a horizontal direction of the lamp or both of horizontal and vertical directions, and wherein said deflection angle control means controls the swivel lamp, before said reference position is set, such that the swivel lamp is; tilted down to a lowermost position in the vertical direction; deflected to a maximum deflection angle in a horizontal direction opposite to an opposite lane; rotated by a predetermined angle in an opposite direction of said horizontal direction, and tilted up by a predetermined angle in the vertical direction.

7. The lighting system for a vehicle according to claim 6 comprising lamp deflection angle control means for changing and controlling a lateral deflection angle in an irradiating direction of a lamp corresponding to a running situation of the vehicle, wherein the lamp deflection angle control means includes means for setting the irradiating direction of the lamp into a preset reference position when the lamp is turned OFF.

8. A lighting system for a vehicle comprising lamp deflection angle control means for changing and controlling a lateral deflection angle in an irradiating direction of a lamp corresponding to a running situation of the vehicle, wherein the lamp deflection angle control means includes means for setting the irradiating direction of the lamp into a preset reference position when the lamp is turned OFF, and wherein said deflection angle control means controls the swivel lamp, before said reference position is set, such that the swivel lamp is deflected to a maximum deflection angle in a direction opposite to an opposite lane, and rotated by a predetermined angle in an opposite direction of said direction.

* * * * *